United States Patent
Terada

(10) Patent No.: US 8,491,368 B2
(45) Date of Patent: Jul. 23, 2013

(54) GAME DEVICE FOR CONTROLLING ACTION BASED ON CHARACTER ABILITY, METHOD FOR CONTROLLING GAME DEVICE, PROGRAM, AND INFORMATION STORAGE MEDIUM

(75) Inventor: Toshiyuki Terada, Chiba (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 164 days.

(21) Appl. No.: 13/057,394

(22) PCT Filed: Jun. 3, 2009

(86) PCT No.: PCT/JP2009/060174
§ 371 (c)(1),
(2), (4) Date: Feb. 3, 2011

(87) PCT Pub. No.: WO2010/016323
PCT Pub. Date: Feb. 11, 2010

(65) Prior Publication Data
US 2011/0136558 A1  Jun. 9, 2011

(30) Foreign Application Priority Data
Aug. 6, 2008 (JP) ............................ 2008-203620

(51) Int. Cl.
*A63F 9/24* (2006.01)
(52) U.S. Cl.
USPC .................................................. 463/7; 463/4

(58) Field of Classification Search
USPC ............................................................ 463/7, 4
See application file for complete search history.

(56) References Cited

U.S. PATENT DOCUMENTS

| | | | |
|---|---|---|---|
| 2005/0221893 A1 | 10/2005 | Ohta | |
| 2007/0060230 A1* | 3/2007 | Kang et al. | 463/3 |
| 2007/0060409 A1 | 3/2007 | Cho et al. | |
| 2008/0085767 A1 | 4/2008 | Takatsuka | |
| 2011/0021272 A1* | 1/2011 | Grant et al. | 463/30 |

FOREIGN PATENT DOCUMENTS

| | | |
|---|---|---|
| CN | 1930570 A | 3/2007 |
| EP | 1 808 211 A2 | 7/2007 |
| JP | 2005-279165 A | 10/2005 |
| JP | 2006-204671 A | 8/2006 |
| JP | 2007-159801 A | 6/2007 |

OTHER PUBLICATIONS

Taiwanese Office Action corresponding to Taiwanese Patent Application No. 98119873, dated Jun. 18, 2012.

* cited by examiner

*Primary Examiner* — Corbett B Coburn
(74) *Attorney, Agent, or Firm* — Sughrue Mion, PLLC

(57) ABSTRACT

A game device capable of enhancing excitement in operating a game character is provided. The game device includes a microprocessor configured to acquire an operation value input by a user, read a parameter condition corresponding to the operation value, read an ability parameter of a player character corresponding to the parameter condition, and control the player character based on a determination of whether the ability parameter satisfies the parameter condition.

21 Claims, 9 Drawing Sheets

FIG.13
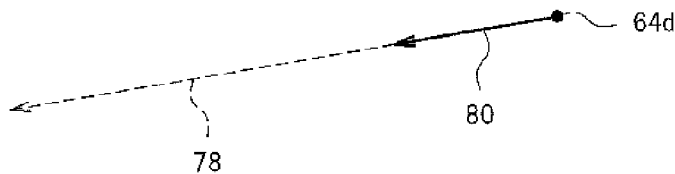
FIG.14
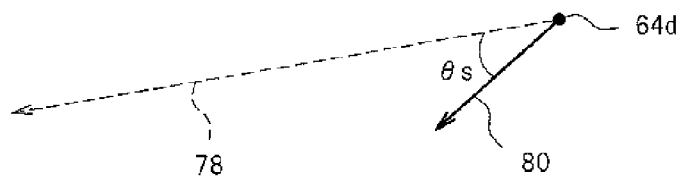
FIG.15
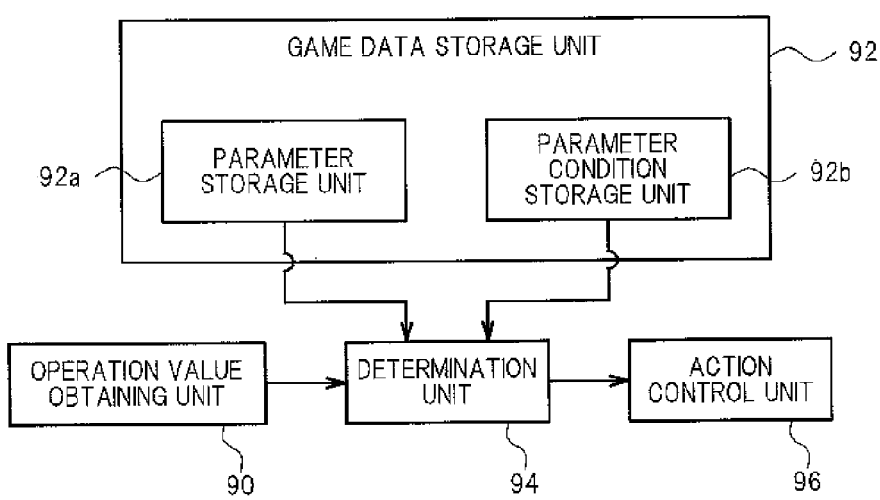
FIG.16
| OPERATION VALUE (v) | DRIBBLE PARAMETER (d) | PASS PARAMETER (p) | SHOOT PARAMETER (s) |
|---|---|---|---|
| $0 \leq v < V1$ | $0 \leq d < D1$ | $0 \leq p < P1$ | $0 \leq s < S1$ |
| $V1 \leq v < V2$ | $D1 \leq d < D2$ | $P1 \leq p < P2$ | $S1 \leq s < S2$ |
| $V2 \leq v < V3$ | $D2 \leq d < D3$ | $P2 \leq p < P3$ | $S2 \leq s < S3$ |
| $V3 \leq v$ | $D3 \leq d$ | $P3 \leq p$ | $S3 \leq s$ |

GAME DEVICE FOR CONTROLLING ACTION BASED ON CHARACTER ABILITY, METHOD FOR CONTROLLING GAME DEVICE, PROGRAM, AND INFORMATION STORAGE MEDIUM

TECHNICAL FIELD

The present invention relates to a game device, a method for controlling a game device, a program, and an information storage medium.

BACKGROUND ART

There is known a game in which a game character acts based on a user's operation. For example, there is known a sport game in which a player character acts based on a user's operation.
[Patent Document 1] JP 2006-204671 A

DISCLOSURE OF THE INVENTION

Problems to be Solved by the Invention

In the above described game, there is a strong desire to enhance excitement related to operation of a game character.

The present invention has been conceived in view of the above, and aims to provide a game device, a method for controlling a game device, a program, and an information storage medium capable of enhancing excitement in operating a game character.

Means for Solving the Problems

In order to solve the above described problems, a game device according to the present invention is a game device for executing a game, comprising: parameter storage means for storing a parameter of a game character; parameter condition storage means for storing a parameter condition so as to be correlated to an operation value condition; operation value obtaining means for obtaining an operation value based on a user's operation; determination means for determining whether or not the parameter satisfies a parameter condition correlated to an operation value condition satisfied by the operation value obtained by the operation value obtaining means; and control means for controlling an action of the game character, based on a result of determination by the determination means.

A method for controlling a game device according to the present invention is a method for controlling a game device for executing a game, comprising: a step of reading content stored in parameter storage means for storing a parameter of a game character; a step of reading content stored in parameter condition storage means for storing a parameter condition so as to be correlated to an operation value condition; an operation value obtaining step of obtaining an operation value based on a user's operation; a determination step of determining whether or not the parameter satisfies a parameter condition correlated to an operation value condition satisfied by the operation value obtained at the operation value obtaining step; and a control step of controlling an action of the game character, based on a result of determination at the determination step.

A program according to the present invention is a program for causing a computer, such as a portable game device, an installation type game device (a consumer game device), a commercial game device, a personal computer, a portable phone, a personal digital assistant (PDA), or the like, to function as a game device for executing a game, the program for causing the computer to function as: means for reading content stored in parameter storage means for storing a parameter of a game character; means for reading content stored in parameter condition storage means for storing a parameter condition so as to be correlated to an operation value condition; operation value obtaining means for obtaining an operation value based on a user's operation; determination means for determining whether or not the parameter satisfies a parameter condition correlated to an operation value condition satisfied by the operation value obtained by the operation value obtaining means; and control means for controlling an action of the game character, based on a result of determination by the determination means.

An information storage medium according to the present invention is a computer readable information storage medium storing the above described program.

According to the present invention, it is possible to enhance excitement in operating a game character.

According to one aspect of the present invention, the control means controls behavior of a target which is a target for an action of the game character, based on the result of determination by the determination means.

According to one aspect of the present invention, the parameter condition storage means may store a parameter value range so as to be correlated to an operation value range. The determination means may determine whether or not a value of the parameter belongs to the parameter value range correlated to the operation value range to which the operation value obtained by the operation value obtaining means belongs. In a case where the determination means determines that the value of the parameter does not belong to the parameter value range, the control means may control an action of the game character based on the difference between the value of the parameter and the representative value of the parameter value range.

According to one aspect of the present invention, the parameter condition storage means may store a parameter value range so as to be correlated to an operation value range. The determination means may determine whether or not the value of the parameter belongs to the parameter value range correlated to the operation value range to which the operation value obtained by the operation value obtaining means belongs. In a case where the determination means determines that the parameter value does not belong to the parameter value range, the control means may control an action of the game character based on the difference between the operation value obtained by the operation value obtaining means and the representative value of the operation value range correlated to the parameter value range to which the value of the parameter belongs.

According to one aspect of the present invention, the game may be a sport game which is played using a moving object. The game character may be a player character. The parameter may include a dribble parameter concerning a dribble action of the player character. The operation value obtaining means may obtain an operation value based on a dribble operation for causing the player character to perform a dribble action. The control means may include dribble action control means for controlling the dribble action of the player character based on the result of determination by the determination means. In a case where the determination means determines that the dribble parameter does not satisfy the parameter condition, the dribble action control means may control the dribble action of the player character such that a distance between the player character performing the dribble action and the moving object becomes larger, compared to a case in which the determination means determines that the dribble parameter satisfies the parameter condition.

According to one aspect of the present invention, the game may be a game of a sport which is played using a moving object. The game character may be a player character. The parameter may include a pass parameter concerning a pass action of the player character. The operation value obtaining means may obtain an operation value based on a pass operation for causing the player character to perform a pass action. The control means may include pass action control means for controlling the pass action of the player character based on the result of determination by the determination means. In a case where the determination means determines that the pass parameter does not satisfy the parameter condition, the pass action control means may control the pass action of the player character such that a displacement between the pass direction designated by a user and a pass direction of the player character becomes larger, compared to a case in which the determination means determines that the pass parameter satisfies the parameter condition.

According to one aspect of the present invention, the game may be a sport game which is played using a moving object. The game character may be a player character. The parameter may include a shoot parameter concerning a shoot action of the player character. The operation value obtaining means may obtain an operation value based on a shoot operation for causing the player character to perform a shoot action. The control means may include shoot action control means for controlling the shoot action of the player character based on the result of determination by the determination means. In a case where the determination means determines that the shoot parameter does not satisfy the parameter condition, the shoot action control means may control the shoot action of the player character such that a displacement between the shoot direction designated by a user and a shoot direction of the player character becomes larger, compared to a case in which the determination means determines that the shoot parameter satisfies the parameter condition.

According to one aspect of the present invention, the control means may control the type of an action of the game character, based on the result of determination by the determination means.

According to one aspect of the present invention, the game may be a sport game which is played using a moving object. The game character may be a player character. The game device further may comprise pointed position obtaining means for obtaining a position pointed at by a user, and receiving means for receiving, in a case where the user points at the moving object, an input operation of a movement trajectory of the moving object. The operation value obtaining means may obtain an operation value concerning an input operation of the movement trajectory of the moving object. The control means may control an action of the player character, based on the movement trajectory of the moving object input by the user and the result of determination by the determination means.

BRIEF DESCRIPTION OF THE DRAWINGS

FIG. 13 is a diagram explaining a shoot action;
FIG. 14 is a diagram explaining the shoot action;
FIG. 15 is a functional block diagram of the game device;
FIG. 16 is a diagram showing one example of parameter condition data.

BEST MODE FOR CARRYING OUT THE INVENTION

In the following, one example of an embodiment of the present invention will be described in detail based on the accompanying drawings. Here, a case in which a game device according to an embodiment of the present invention is realized using a portable game device will be described.

[1. Game Device Structure]

Figure 1:
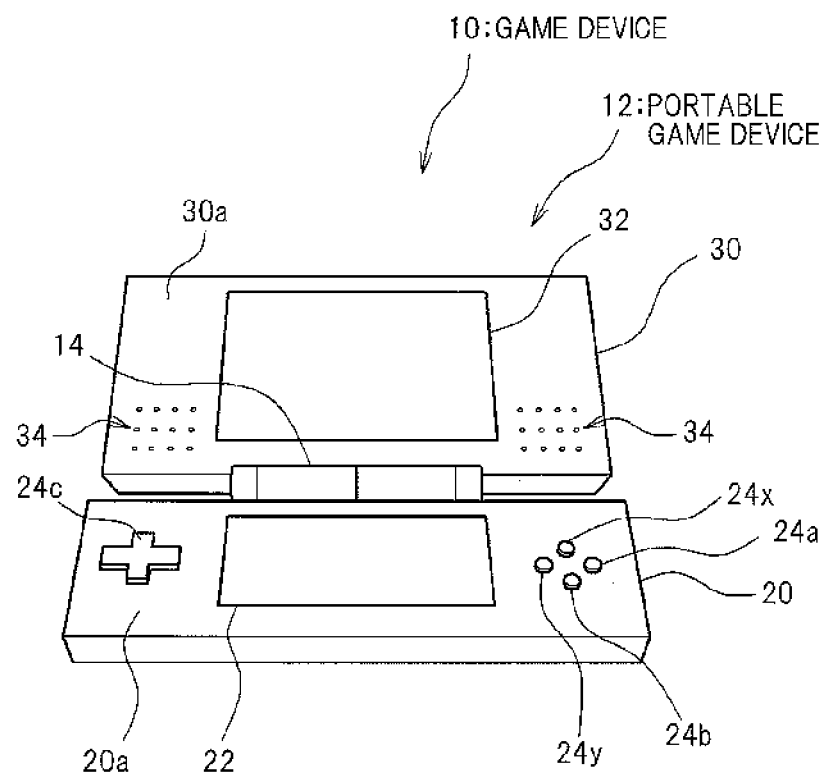
FIG. 1 is a diagram showing external appearance of a game device according to an embodiment of the present invention.
Figure 2:
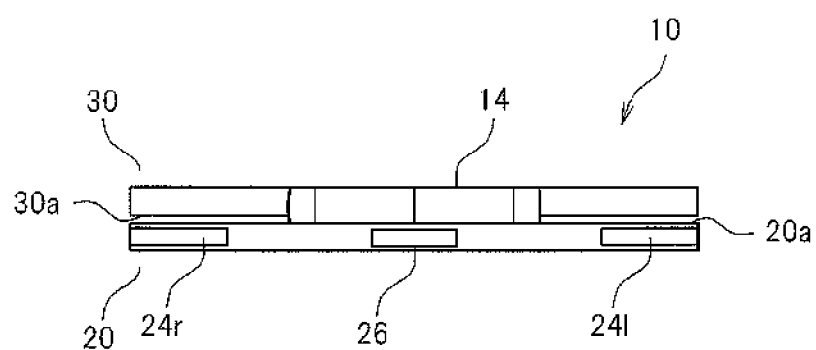
FIG. 2 is a diagram showing external appearance of the game device according to the embodiment of the present invention.
Figure 3:
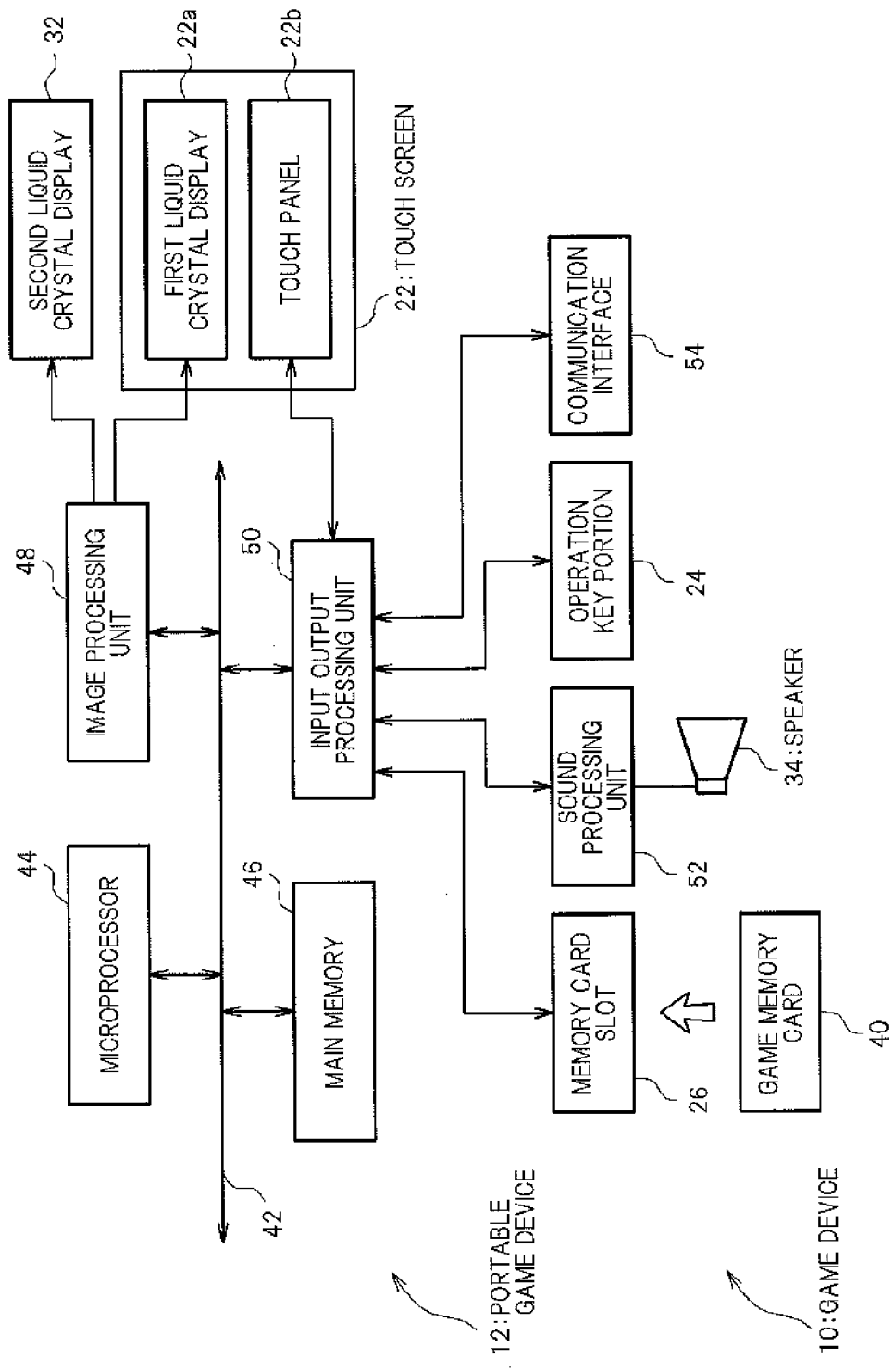
FIG. 3 is a diagram showing a hardware structure of the game device according to the embodiment of the present invention.

FIGS. 1 and 2 show external appearance of a game device 10 (a portable game device 12) according to the embodiment. FIG. 3 shows a hardware structure of the game device 10 according to the embodiment.

FIG. 1 is a perspective view of the game device 10 viewed from the front thereof. As shown in FIG. 1, the game device 10 comprises a first enclosure 20 and a second enclosure 30 which are connected to each other by a hinge 14. A touch screen 22, a cross button 24c, and buttons 24a, 24b, 24x, 24y are formed on the front surface 20a of the first enclosure 20. The touch screen 22 has a first liquid crystal display 22a and a touch panel 22b placed on the first liquid crystal display 22a (see FIG. 3). The cross button 24c is used to designate, for example, a direction; the buttons 24a, 24b, 24x, 24y are used in various operations. A second liquid crystal display 32 is formed on the front surface 30a of the second enclosure 30. The second enclosure 30 incorporates a speaker 34.

FIG. 2 is a rear elevation view of the game device 10 in a folded position (with the front surface 20a of the first enclosure 20 and the front surface 30a of the second enclosure 30 placed one on the other). As shown in FIG. 2, buttons 24l, 24r are formed on the left and right respective portions on the rear side lateral surface of the first enclosure 20, and a memory card slot 26 for accepting a game memory card 40 (see FIG. 3), or an information storage medium, is formed at the middle portion on the same surface. Other members (not shown), such as a power switch and so forth, may be provided to the game device 10.

As shown in FIG. 3, the game device 10 comprises a touch screen 22 (the first liquid crystal display 22a and the touch panel 22b), an operation key portion 24, a memory card slot 26, a second liquid crystal display 32, a speaker 34, a bus 42, a microprocessor 44, a main memory 46, an image processing unit 48, an input output processing unit 50, a sound processing unit 52, and a communication interface 54. These elements are accommodated in an enclosure together with a battery (not shown), and are driven using the battery.

The microprocessor 44 controls the respective units of the game device 10, based on an operating system stored in a ROM (not shown) and/or a program and data stored in the game memory card 40. The main memory 46 includes, for example, a RAM. A program read from the game memory card 40 is written into the main memory 46 when necessary. The main memory 46 is used also as a working memory of the microprocessor 44. The bus 42 is used for exchanging address and data among the respective units of the game device 10. The microprocessor 44, the main memory 46, the image processing unit 48, and the input output processing unit 50 are mutually connected for data communication via the bus 42.

The first liquid crystal display 22a and the second liquid crystal display 32 are publicly known liquid crystal display panels. The image processing unit 48 includes a VRAM and renders an image into the VRAM according to an instruction from the microprocessor 44. An image rendered in the VRAM is displayed on the first liquid crystal display 22a or the second liquid crystal display 32 at a predetermined time.

The input output processing unit 50 is an interface via which the microprocessor 44 exchanges data with the touch panel 22b, the operation key portion 24, the memory card slot 26, the sound processing unit 52, or the communication interface 54. The touch panel 22b, the operation key 24, the memory card slot 26, the sound processing unit 52, and the communication interface 54 are connected to the input output processing unit 50.

The operation key portion 24 is an input means on which a user inputs an operation. The operation key portion 24 includes the cross button 24c and the buttons 24a, 24b, 24x, 24y, 24l, 24r. The input output processing unit 50 scans the state of the respective keys of the operation key portion 24 every constant cycle (e.g., every $\frac{1}{60}^{th}$ of a second) and sends an operating signal describing a scanning result to the microprocessor 44 via the bus 42. The microprocessor 44 determines the content of an operation by a user, based on the operating signal. The touch panel 22b also is an input means on which a user inputs an operation. The touch panel 22b supplies pressed position information in accordance with a position pressed by a user to the microprocessor 44 via the input output processing unit 50. The microprocessor 44 determines the position pressed by a user on the touch panel 22b, based on the pressed position information.

The memory card slot 26 reads a program and data recorded in the game memory card 40. The game memory card 40 comprises a ROM for storing a program and data and an EEPROM for storing, for example, save data or the like. Note that although a game memory card 40 is used here to supply a program and data to the game device 10, any other information storage medium, such as an optical disk or the like, may be used instead. Alternatively, a program and data may be supplied from a remote place to the game device 10 via a communication network such as the Internet or the like. Still alternatively, a program and data may be supplied to the game device through various data communication, such as infrared communication and so forth.

The sound processing unit 52 includes a sound buffer and outputs, via the speaker 34, various sound data read from the game memory card 40 into the sound buffer. The communication interface 54 is an interface for connection of the game device 10 to a communication network.

The game device 10 having the above-described structure executes a soccer game which simulates a soccer match between a first team operated by a user and a second team. The soccer game is realized by the microprocessor 44 executing a program stored in the game memory card 40. This soccer game will be described below.

[2. Game Screen]

Figure 4:
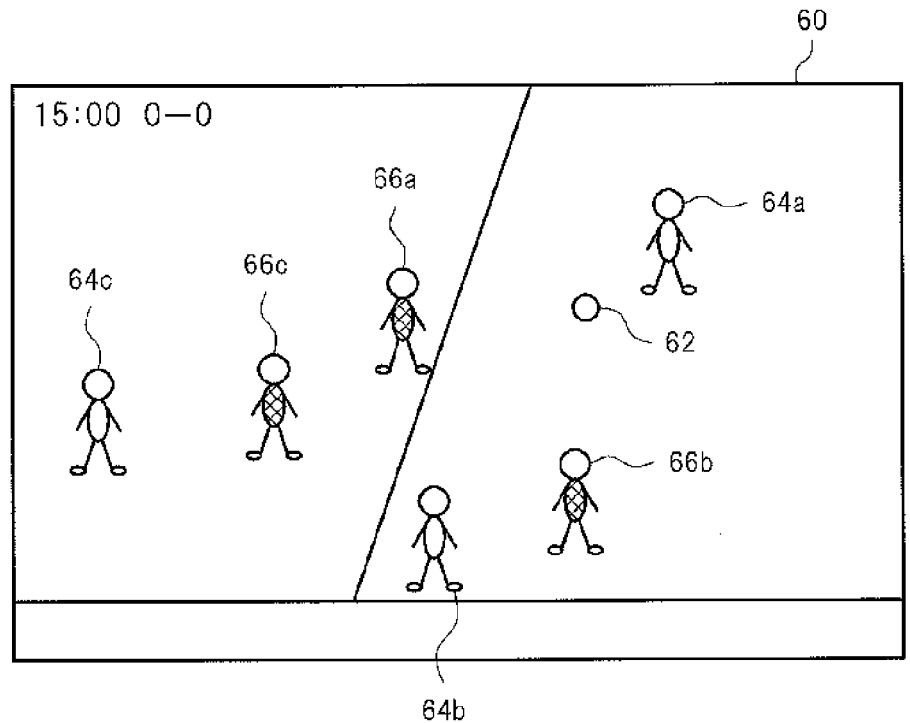
FIG. 4 is a diagram showing one example of a game screen.

FIG. 4 is a diagram showing one example of a game screen for the soccer game. The game screen 60 shown in FIG. 4 is produced using, for example, three dimensional computer graphics techniques. In the game screen 60 shown in FIG. 4, a ball 62 (a moving object) representing a soccer ball and player characters 64a, 64b, 64c, 66a, 66b, 66c representing soccer players are shown. The player characters 64a, 64b, 64c belong to the first team, while the player characters 66a, 66b, 66c belong to the second team. In the game screen 60 shown in FIG. 4, neither player character holds the ball 62.

[3. Operation Carried Out by User]

An operation to be carried out by a user in a soccer game will be described. In a soccer game, a user points at the ball 62 or gives a movement instruction to the ball 62 to thereby give an action instruction to a player character belonging to the first team. In the following, an operation for moving a player character to a desired position (e.g., the position of the ball 62) and an operation for causing a player character to dribble, pass, or shoot will be mainly described.

[3-1. Movement Operation]

Initially, an operation for moving a player character to a desired position will be described. Specifically, in order to move a player character to a movement destination position, a user presses a position on a touch panel 22b corresponding to a movement destination position to thereby designate a movement destination position. With a movement destination position designated by a user, a player character located closest to the designated movement destination position among those belonging to the first team starts moving toward the movement destination position. Note that although it is described below that a touch pen is used to press the touch panel 12 with, the touch panel 22b may be pressed with a finger, for example, instead.

When neither player character is in possession of the ball 62, a user presses, using a touch pen, an area on the touch panel 22b corresponding to the area where the ball 62 is displayed, in order to cause a player character of the first team to take possession of the ball 62. Note that to press an area on the touch pen 22b corresponding to the area where the ball 62 is displayed will be thereafter simply referred to as "to point at the ball 62" or "to press the ball 62".

Figure 5:
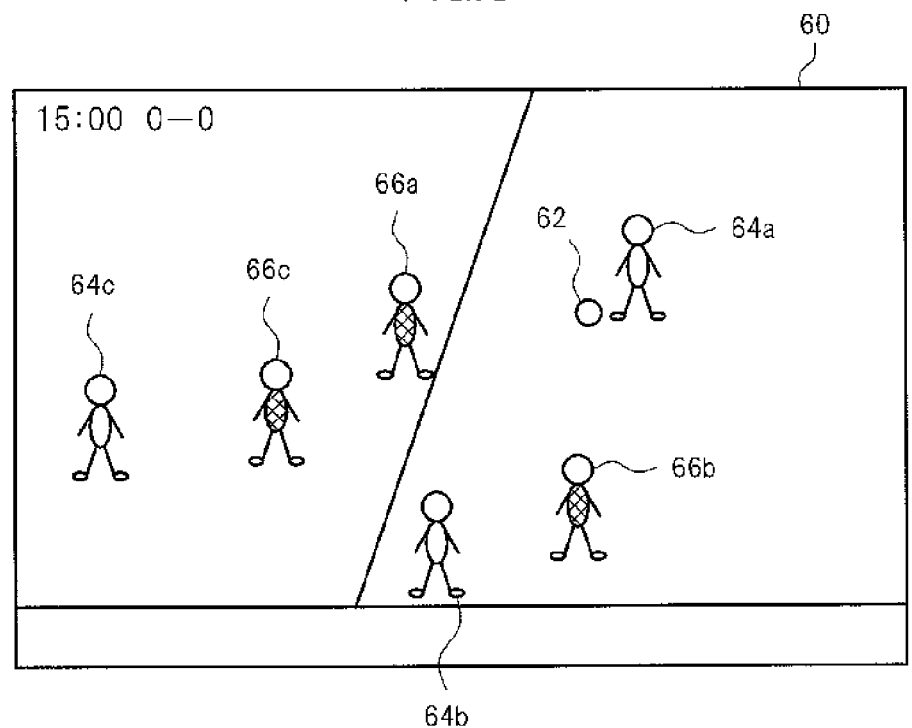
FIG. 5 is a diagram showing one example of the game screen.

With the ball 62 pointed at by a user in the situation shown in FIG. 4, the player character 64a located closest to the ball 62 among those belonging to the first team starts moving toward the ball 62. When the player character 64a reaches the ball 62 earlier than any player character 66a, 66b, 66c belonging to the second team, the player character 64a takes possession of the ball 62. FIG. 5 shows one example of a game screen 60 to be shown in the above. As described above, by pointing at the ball 62, a user can instruct a player character belonging to the first team to move to the ball 62.

[3-2. Dribble Operation]

Below, an operation (a dribble operation) for causing a player character in possession of the ball 62 to dribble will be described. For example, in order to cause the player character 64a in possession of the ball 62 shown in the game screen 60 in FIG. 5 to dribble, a user inputs a trajectory to be followed by the ball 62 while the player character 64a moves while dribbling (hereinafter referred to as a "dribble trajectory") to thereby give a movement instruction to the ball 62. Specifically, a user presses the ball 62, using a touch panel, and thereafter slides the tip end of the touch pen on the touch panel 22b to thereby give a movement instruction to the ball 62 (input of a dribble trajectory). With a movement instruction given to the ball 62 (input of a dribble trajectory), the player character 64a in possession of the ball 62 begins a dribble action based on the content of the instruction (trajectory). As described above, by giving a movement instruction to the ball 62, a user can instruct a player character in possession of the ball 62 to carry out a dribble action. Note that an operation of sliding the tip end of a touch pen on the touch panel 22b will be hereinafter referred to as a "slide operation".

Figure 6:
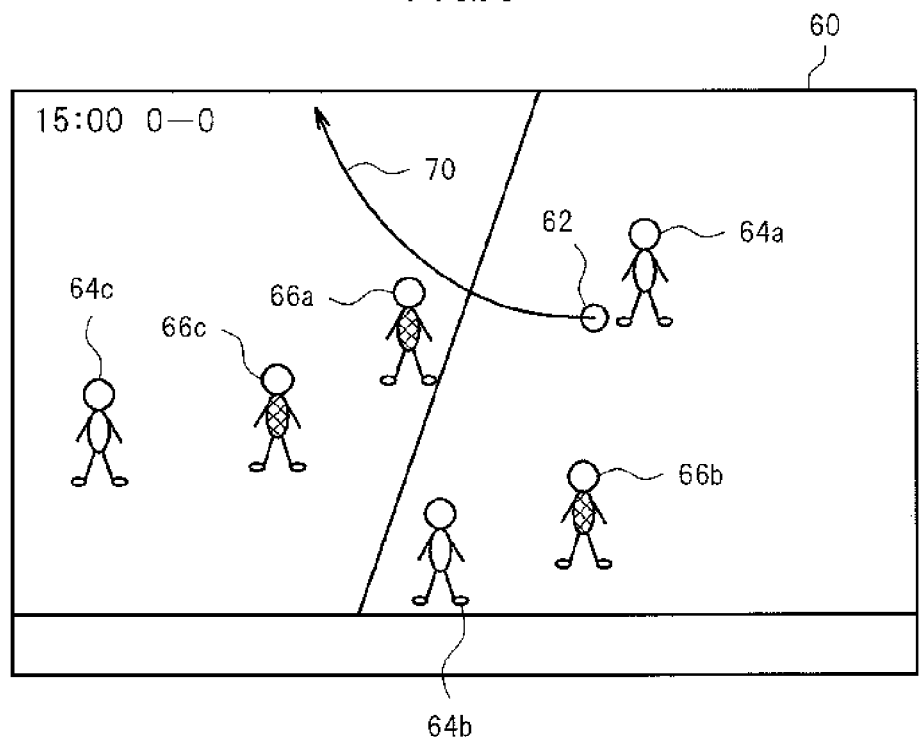
FIG. 6 is a diagram showing one example of the game screen.

FIG. 6 shows one example of a game screen 60 to be displayed in a case where the dribble operation is performed. The trajectory 70 shown in FIG. 6 indicates the dribble trajectory input by a user.

A user can designate a dribble speed for the player character 64a by adjusting the speed of a slide operation. A "dribble speed" refers to a speed at which the player character 64a is performing a dribble action. A "speed of a slide operation" refers to a speed at which the tip end of a touch pen is slid. Supposing that the trajectory 70 having the length l is input by a user and a period of time t is needed to input the trajectory 70, the speed v of a slide operation is calculated using the expression (A) below.

$$v = l/t \quad (A)$$

A faster sliding speed results in a faster dribble speed of the player character 64a. However, if the player character 64a does not have sufficient dribble ability to perform the dribble action at the speed designated by a user, the player character 64a cannot control the ball 62 well during the dribble action.

Figure 7:
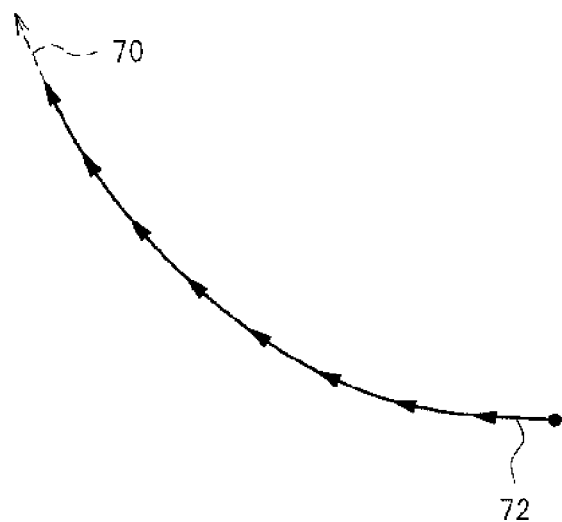
FIG. 7 is a diagram explaining a dribble action.
Figure 8:
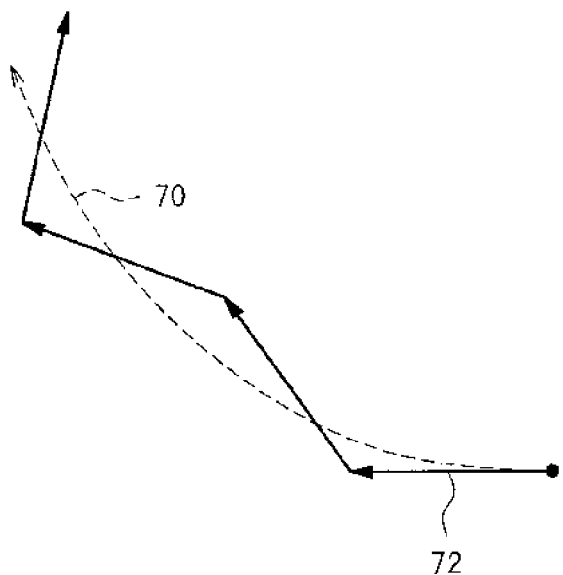
FIG. 8 is a diagram explaining the dribble action.

FIG. 7 is a diagram explaining the dribble action performed by the player character 64a having the above-described dribble ability, and FIG. 8 is a diagram explaining the dribble action performed by the player character 64a not having the above-described dribble ability. In FIGS. 7 and 8, the arrow 72 indicates a kick direction in which the player character 64a performing the dribble action kicks the ball 62 and a kick strength with which that kick is made. A longer arrow 72 indicates a stronger force with which the ball 62 is kicked. The ball 62 being kicked with a strong force results in a longer maximum distance between the dribbling player character 64a and the kicked ball 62. That is, it can be understood that the length of the arrow 72 represents the maximum distance between the ball 62 and the player character 64a performing the dribble action.

If the player character 64a has the above-described dribble ability, the ball 62 will be kicked with a relatively small force, as shown in FIG. 7, and therefore, a relatively short distance results between the player character 64a performing the dribble action and the kicked ball 62. This resultantly enables dribbling by the player character 64a along the trajectory 70 designated by a user even when a curved line, such as is shown in FIG. 6, is input as the dribble trajectory 70 (see FIG. 7).

Meanwhile, if the player character 64a does not have the above-described dribble ability, the ball 62 will be kicked with a relatively strong force, as shown in FIG. 8, and therefore, a relative long distance results between the player character 64a performing the dribble action and the ball 62. This makes it likely that the ball 62 being dribbled by the player character 64a will be lost. Further, if a curved line such as is shown in FIG. 6 is input as the dribble trajectory 70, due to kicking the ball 62 with a relatively strong force, the player character 64a cannot keep dribbling on the trajectory 70 designated by a user (see FIG. 8). That is, a relatively large displacement results between the trajectory followed by the player character 64a performing the dribble action (ball 62) and the trajectory 70 designated by a user.

That is, a user needs to adjust the speed of a slide operation, while considering the dribble ability of the player character 64a. This can give a user the enjoyment of being required to adjust the speed of a slide operation while considering the dribble ability of the player character 64a. This resultantly enhances excitement related to a dribble operation.

[3-3. Pass Operation]

Below, an operation for causing a player character to make a pass (a pass operation) will be described. Here, a case in which a user instructs, on the game screen 60 shown in FIG. 5, the player character 64a to make a pass to the player character 64b and also instructs the player character 64b, which will receive the pass from the player character 64a, to make a pass to the player character 64c, will be described.

Figure 9:
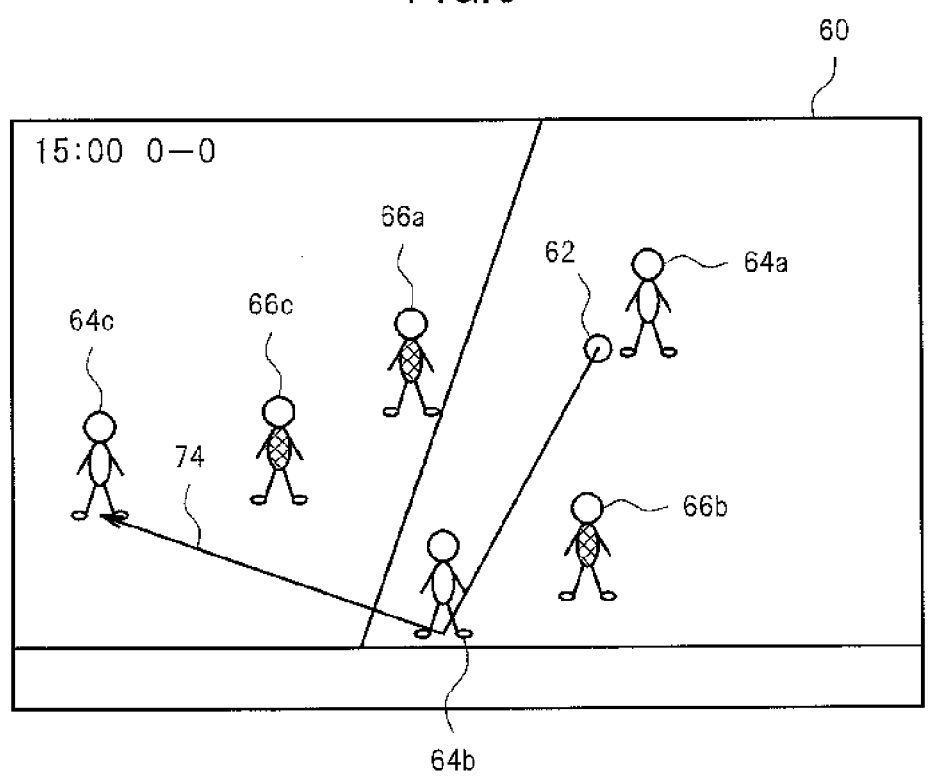
FIG. 9 is a diagram showing one example of the game screen.

In this case, a user inputs a trajectory to be followed by the ball 62 being passed (hereinafter referred to as a "pass trajectory") to thereby give a movement instruction to the ball 62. Specifically, a user presses the ball 62, using a touch pen, while pressing a predetermined button (e.g., the button 24l) and thereafter slides the touch pen to thereby give a movement instruction to the ball 62 (input of a pass trajectory). In the above, a user inputs a pass trajectory such that the player characters 64b and 64c are located on the trajectory. With a movement instruction given to the ball 62 (input of a pass trajectory), the player characters 64a, 64b perform a pass action, based on the content of the instruction (trajectory). As described above, a user can instruct a player character to perform a pass action by giving a movement instruction to the ball 62. FIG. 9 shows one example of a game screen 60 to be displayed in a case where a pass operation is performed. The trajectory 74 shown in FIG. 9 indicates the pass trajectory input by a user.

Note that a user can adjust the pass speed, that is, the moving speed of the ball 62 passed, by adjusting the speed of a slide operation. That is, a faster speed of a slide operation results in a faster pass speed. At a faster pass speed, a pass is less likely to be blocked by a player character of the second team, compared to a case with a slower pass speed.

However, if the player character 64a does not have sufficient pass ability to make an accurate pass at the speed designated by a user, accuracy of the pass to the player character 64b deteriorates. Similarly, if the player character 64b does not have sufficient pass ability to make an accurate pass at a speed designated by a user, accuracy of a pass to the player character 64c deteriorates.

Figure 10:
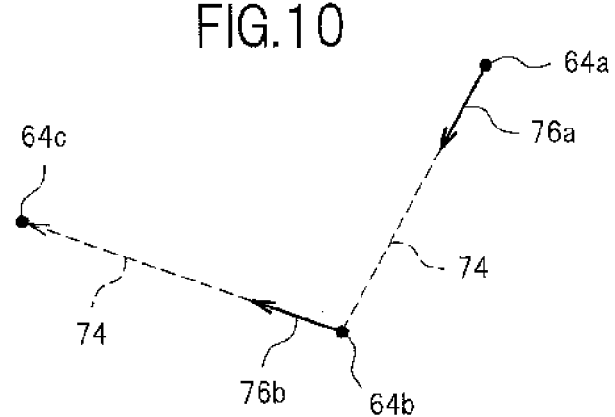
FIG. 10 is a diagram explaining a pass action.
Figure 11:
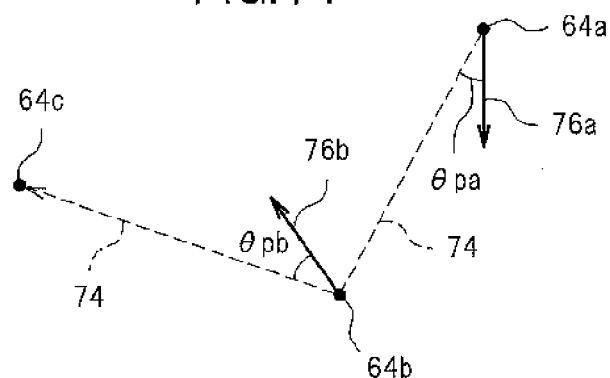
FIG. 11 is a diagram explaining the pass action.

FIG. 10 is a diagram explaining a pass to be made when the player characters 64a, 64b have the above described pass ability, and FIG. 11 is a diagram explaining a pass to be made when the player characters 64a, 64b do not have the above described pass ability.

If the player character 64a has the above described pass ability, the pass direction 76a of the player character 64a is set substantially coinciding with the pass direction (trajectory 74) designated by a user, as shown in FIG. 10. As a result, the ball 62 starts moving toward the player character 64b. Meanwhile, if the player character 64a does not have the above described pass ability, the pass direction 76a of the player character 64a is set displaced from the pass direction (trajectory 74) designated by a user, as shown in FIG. 11. That is, while the angle θpa between the pass direction 76a of the player character 64a and the pass direction (the trajectory 74) designated by a user becomes substantially 0 when the player character 64a has the above described pass ability, the above-described angle θpa becomes larger when the player character 64a does not have the above described pass ability, compared to a case in which the player character 64a has the above described pass ability. As a result, a pass from the player character 64a to the player character 64b fails.

Similarly, if the player character 64b has the above described pass ability, a pass direction 76b of the player character 64b is set substantially coinciding with the pass direction (trajectory 74) designated by a user, as shown in FIG. 10. Meanwhile, if the player character 64b does not have the above described pass ability, the pass direction 76b of the player character 64b is set displaced form the pass direction (trajectory 74) designated by a user, as shown in FIG. 11. That is, while the angle θpb between the pass direction 76b of the player character 64b and the pass direction (trajectory 74) designated by a user becomes substantially equal to 0 when the player character 64b has the above described pass ability, the above-described angle θpb becomes larger when the player character 64b does not have the above described pass ability, compared to a case in which the player character 64b has the above described pass ability. As a result, a pass from the player character 64b to the player character 64c fails.

Therefore, a user needs to adjust the speed of a slide operation while considering the pass ability of the player characters 64a, 64b involved in a pass action. This can give a user the enjoyment of being required to adjust the speed of a slide operation while considering the pass ability of the player characters 64a, 64b involved in a pass action. This resultantly enhances excitement related to a pass operation.

[3-4. Shoot Operation]

Figure 12:
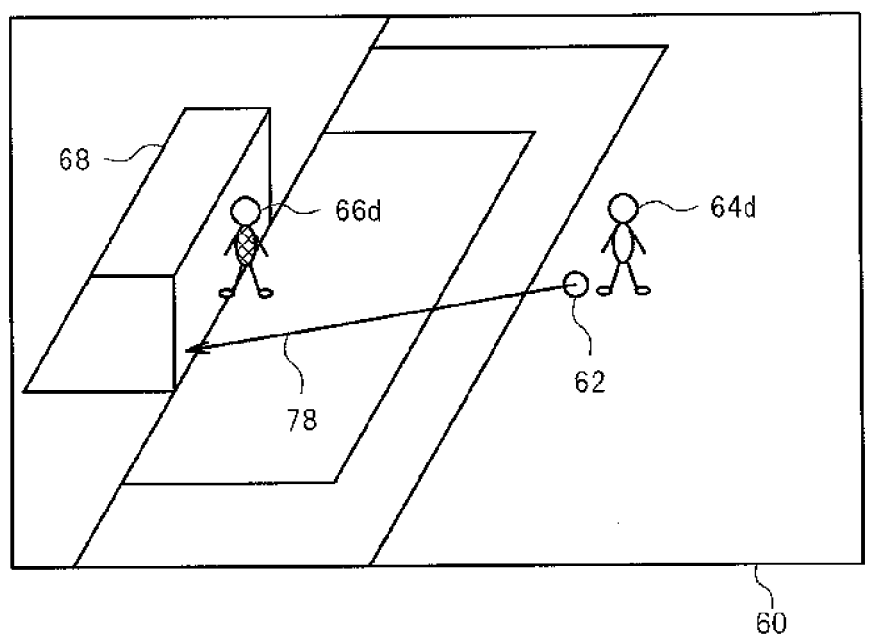
FIG. 12 is a diagram showing one example of the game screen.

Below, an operation (shoot operation) for causing a player character to shoot will be described. FIG. 12 is a diagram explaining a shoot operation. In the game screen 60 shown in FIG. 12, the ball 62, a player character 64d belonging to the first team, a player character 66d acting as the goalkeeper of the second team, and a goal 68 are shown. Here, a case in which the player character 64d is caused to shoot will be described.

In this case, a user inputs a trajectory to be followed by the ball 62 being kicked (hereinafter referred to as a "shoot trajectory") to thereby give a movement instruction to the ball 62. Specifically, a user presses the ball 62, using a touch pen, while pressing a predetermined button (button 24r), and thereafter slides the touch pen to thereby give a movement instruction to the ball 62 (input of a shoot trajectory). With a movement instruction given to the ball 62 (input of a shoot trajectory), the player character 64d performs a shoot action based on the content of the instruction (trajectory). As described above, by giving a movement instruction to the ball 62, a user can instruct a player character to perform a shoot action. The trajectory 78 shown in FIG. 12 indicates the shoot trajectory input by a user.

Note that a user can designate a shoot speed, that is, the moving speed of the ball 62 being kicked, by adjusting the sliding speed of the touch pen. Specifically, a faster sliding speed results in a faster shoot speed. The faster the shoot speed becomes, the more unlikely the shot is to be blocked by the player character 66d, or the goal keeper of the second team.

However, if the player character 64d which is to shoot does not have sufficient shoot ability to make an accurate shoot at the speed designated by a user, shoot accuracy deteriorates. FIG. 13 is a diagram explaining a shot to be made when the player character 64d has the above described shoot ability, while FIG. 14 is a diagram explaining a shot to be made when the player character 64d does not have the above described shoot ability.

If the player character 64d has the above described shoot ability, the shoot direction 80 of the player character 64d is set substantially coinciding with the shoot direction (trajectory 78) designated by a user, as shown in FIG. 13. As a result, the ball 62 being kicked will move on the trajectory 78 designated by a user. Meanwhile, if the player character 64d does not have the above described shoot ability, the shoot direction 80 of the player character 64d is set displaced from the shoot direction (trajectory 78) designated by a user, as shown in FIG. 14. That is, while the angle θs between the shoot direction 80 of the player character 64d and the shoot direction (trajectory 78) designated by a user becomes substantially equal to 0 when the player character 64d has the above described shoot ability, the above-described angle θs becomes larger when the player character 64d does not have the above described shoot ability, compared to a case in which the player character 64d has the above described ability. As a result, for example, the ball 62 will more likely move toward the outside of the goal 68 or in front of the goal keeper player character 66d.

With the above, a user needs to adjust the speed of a slide operation while considering the shoot ability of the player character 64d. This can give a user the enjoyment of being required to adjust the speed of a slide operation while considering the shoot ability of the player character 64d. This resultantly enhances excitement of a shoot operation.

[3-5. Defense Operation]

Below, an operation (defense operation) to be performed when a player character of the second team is in possession of the ball 62 will be described. When a player character of the second team is in possession of the ball 62, a user instructs a player character of the first team to deprive the player character of the second team of the ball 62. Specifically, a user points at the ball 62, using a touch pen. Thereupon, a player character located closest to the ball 62 among those of the first team starts moving toward the ball 62 to take the ball 62. Note that when a user points at a position other than the ball 62, a player character located closest to that pointed position among those of the first team starts moving toward the pointed position. As described above, by pointing at the ball 62, a user can instruct a player character of the first team to defend against a second team player character in possession of ball 62.

[4. Function Block]

Below, a structure for realizing the above-described soccer game will be described. FIG. 15 mainly shows a function block related to the present invention among those realized in the game device 10. As shown in FIG. 15, the game device 10 comprises an operation value obtaining unit 90, a game data storage unit 92, a determination unit 94, and an action control unit 96. The game data storage unit 92 is realized mainly using, for example, the game memory card 40 and the main memory 46. The operation value obtaining unit 90, the determination unit 94, and the action control unit 96 are realized mainly using the microprocessor 44.

[4-1. Operation Value Obtaining Unit]

The operation value obtaining unit 90 obtains an operation value, based on a user's operation. In this embodiment, the operation value obtaining unit 90 (pointed position obtaining means) obtains a position pointed at by a user every predetermined period of time (e.g., $\frac{1}{60}^{th}$ of a second) and determines whether or not the user points at the ball 62. With the ball 62 pointed at by a user, the operation value obtaining unit 90 (receiving means) accepts a slide operation as an input operation of a movement trajectory of the ball 62 (dribble, pass, or shoot trajectory) and obtains the operation value of the slide operation, which is, for example, the speed of the slide operation. Supposing that a locus having the length being l is input through a slide operation and a period of time t is needed to input the locus, the speed v of the slide operation is obtained using the above-described expression (A).

Note that an operation value of a slide operation may be a numeric value indicating the length of a locus input through a slide operation, or a manner in which the locus is bent. Alternatively, the operation value obtaining unit 90 may obtain an operation value of an operation other than a slide operation. For example, the operation value obtaining unit 90 may obtain an operation value of a button pressing operation (e.g., the button 24a or the like). Specifically, for example, in the case where the button is a pressure sensitive button and a numeric value indicating the strength of a force with which the button is pressed is output, the numeric value may be obtained as an operation value. Still alternatively, the number of times a user presses the button (e.g., the button 24a, or the like) may be obtained as an operation value.

[4-2. Game Data Storage Unit]

The game data storage unit 92 stores data for executing a soccer game. For example, data describing a current game situation is stored in the game data storage unit 92. For example, data such as is shown below is stored:

(1) data describing the current state (e.g., a position, posture, a movement direction, or the like) of a player character;
(2) data describing the current state (e.g., a position, a movement direction, and so forth) of the ball 62;
(3) data identifying a player character in possession of the ball 62; and
(4) data telling the scores of both teams and the elapsed period of time.

The game data storage unit 92 comprises a parameter storage unit 92a and a parameter condition storage unit 92b. The parameter storage unit 92a stores a parameter of a player character. Specifically, ability parameters indicating various abilities of a player character are stored in the parameter storage unit 92a. For example, ability parameters such as those shown below are stored:

(1) dribble parameter indicating the dribble ability;
(2) pass parameter indicating the pass ability; and
(3) shoot parameter indicating the shoot ability.

The parameter condition storage unit 92b stores an operation value condition concerning an operation value and a parameter condition concerning a parameter of a player character so as to be correlated to each other. FIG. 16 shows one example of parameter condition data stored in the parameter condition storage unit 92b. In the parameter condition data shown in FIG. 16, each of a plurality of operation value ranges is correlated to parameter value ranges of a dribble parameter, a pass parameter, and a shoot parameter. Note that an "operation value range" corresponds to an "operation value condition"; a "parameter value range" corresponds to a "parameter condition".

[4-3. Determination Unit]

The determination unit 94 determines whether or not an operation value obtained by the operation value obtaining unit 90 satisfies an operation value condition stored in the parameter condition storage unit 92b, and further whether or not a parameter of a player character satisfies a parameter condition correlated to the operation value condition satisfied by the operation value.

[4-4. Action Control Unit]

The action control unit 96 controls an action of a player character, based on the result of determination by the determination unit 94. For example, a ball 62-related action of a player character is controlled by the action control unit 96. In this case, for example, behavior of the ball 62 (target), or a target for an action of the player character, is controlled.

Specifically, the dribble action of a player character (movement of the ball 62) is controlled based on the movement trajectory of the ball 62 (a dribble trajectory) input by a user and the result of determination by the determination unit 94. For example, if the dribble parameter of a player character does not satisfy a parameter condition, the dribble action of the player character (movement of the ball 62) is controlled such that a distance between the player character performing a dribble action and the ball 62 becomes larger, compared to a case in which the dribble parameter satisfies a parameter condition. Further, for example, if the dribble parameter of a player character does not satisfy a parameter condition, the dribble action of the player character (movement of the ball 62) is controlled such that a displacement between the dribble trajectory of the player character and the dribble trajectory 70 designated by a user becomes larger, compared to a case in which the dribble parameter satisfies a parameter condition.

Further, the pass action or shoot action of a player character (movement of the ball 62) is controlled based on the movement trajectory of the ball 62 (a pass or a shoot trajectory) input by a user and the result of determination by the determination unit 94. For example, a pass direction or a shoot direction of a player character is controlled. Specifically, if the pass parameter of a player character does not satisfy a parameter condition, the pass action of the player character (movement of the ball 62) is controlled such that an angle (θpa or θpb) between the pass direction 76 of the player character and the pass direction (trajectory 74) designated by a user becomes larger, compared to a case in which the pass parameter satisfies a parameter condition. Further, similarly, if the shoot parameter of a player character does not satisfy a parameter condition, the shoot action of the player character (movement of the ball 62) is controlled such that a angle (θs) between the shoot direction 80 of the player character and the shoot direction (trajectory 78) designated by a user becomes larger, compared to a case in which the shoot parameter satisfies a parameter condition.

[5. Process to be Carried Out in the Game Device]

Below, a process to be carried out in the game device 10 will be described. The above-described function blocks are realized by carrying out the process described below in the game device 10.

[5-1. Process to be Carried Out When Dribble Operation is Performed]

Figure 17:
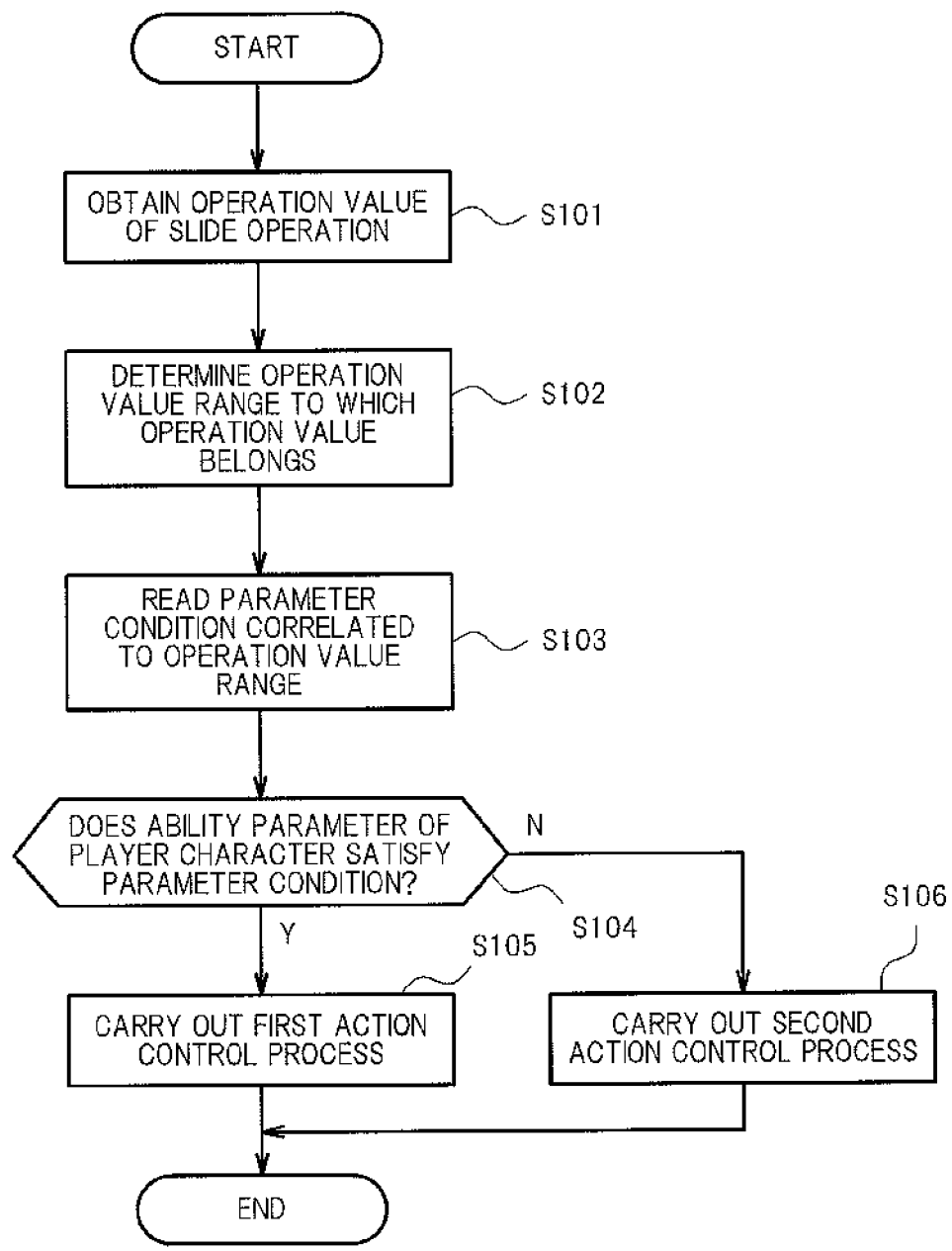
FIG. 17 is a flowchart of a process to be carried out in the game device.

FIG. 17 is a flowchart of a process to be carried out in the game device 10 in a case where a dribble operation is performed. The microprocessor 44 carries out the process shown in FIG. 17, according to a program stored in the game memory card 40.

If a dribble operation is performed, initially, the microprocessor 44 (operation value obtaining unit 90) obtains the operation value v of a slide operation (S101), as shown in FIG. 17. Specifically, in a case where a dribble operation is performed, trajectory data describing the trajectory 70 input through the slide operation is stored in the main memory 46. The operation value v of the slide operation is calculated based on that trajectory data.

Figure 18:
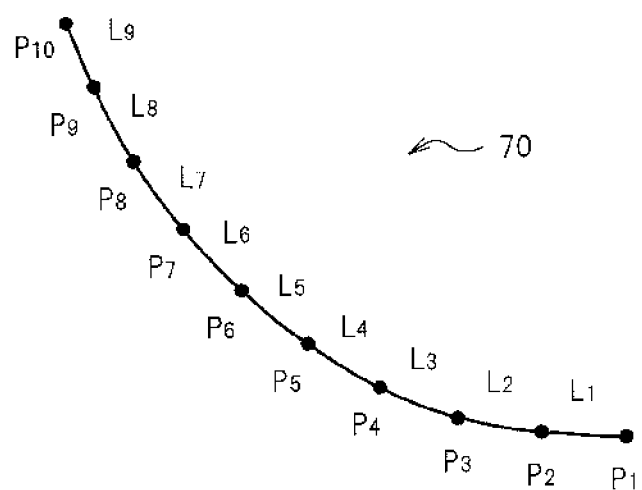
FIG. 18 is a diagram explaining trajectory data.

FIG. 18 shows one example of trajectory data. The trajectory data indicates pressed positions ($P_1$ to $P_{10}$) pressed by a user every predetermined period of time ($\frac{1}{60}^{th}$ of a second here) during a slide operation. The pressed position $P_1$ indicates a pressed position at the beginning of a slide operation; the pressed position $P_{10}$ indicates a pressed position at the end of the slide operation.

For calculation of the operation value v of a slide operation, the length l of the trajectory 70 is calculated. Specifically, the length l of the trajectory 70 is calculated by obtaining the sum of the distances between the respective pressed positions. In the example shown in FIG. 18, the length l of the trajectory 70 is calculated using the expression (B) below. Note that $L_n$ (n:

an integer between 1 and 9) in FIG. 18 indicates the distance from the pressed position $P_n$ to the pressed position $P_{n+1}$.

$$l = L_1 + L_2 + L_3 + L_4 + L_5 + L_6 + L_7 + L_8 + L_9 \tag{B}$$

In addition, a period of time t needed to input the trajectory 70 is also obtained. As pressed positions $P_1$ to $P_{10}$ represent pressed positions every predetermined period of time ($\frac{1}{60}^{th}$ of a second in this embodiment), the period of time t needed to input the trajectory 70 is calculated using the following expression (C), in which the letter "N" indicates the number of pressed positions.

$$t = (N-1) * (\tfrac{1}{60}) \tag{C}$$

In a case where the length l of the trajectory 70 and the period of time t needed to input the trajectory 70 are calculated, as described above, the operation value v of a slide operation is calculated using the above-described expression (A).

Then, in a case where the operation value v of a slide operation is obtained, the microprocessor 44 (determination unit 94) determines to which of the plurality of operation value ranges set on the parameter condition data the operation value v belongs (S102).

Thereafter, the microprocessor 44 (determination unit 94) reads from the parameter condition data a parameter condition correlated to the operation value range to which the operation value v belongs (S103). That is, a dribble parameter condition correlated to the operation value range to which the operation value v belongs is read.

Then, the microprocessor 44 (determination unit 94) determines whether or not the ability parameter of a player character in possession of the ball 62 satisfies the parameter condition (S104). That is, whether or not the dribble parameter of the player character in possession of the ball 62 satisfies the condition read at S103 is determined.

If it is determined that the ability parameter of the player character satisfies the parameter condition, the microprocessor (action control unit 96) carries out a first action control process to thereby control the dribble action of the player character (S105). Meanwhile, if it is determined that the ability parameter of the player character does not satisfy the parameter condition, the microprocessor 44 (action control unit 96) carries out a second action control process to thereby control the dribble action of the player character (S106).

In the first and second action control processes, initially, the dribble speed of the player character is determined based on the operation value v of a slide operation. For example, data correlating an operation value v of a slide operation and a dribble speed is read from the game memory card 40, and a dribble speed corresponding to the operation value v of a slide operation is obtained based on the data. Note that the above-described data is set such that a larger operation value v of a slide operation, that is, a faster speed of a slide operation, results in a faster dribble speed of a player character. The above-described data may be table format data or expression format data.

In the first action control process, a strength with which a player character performing a dribble action kicks the ball 62 is set to a first strength. In other words, in the first action control process, an acceleration of the ball 62 kicked by a player character performing a dribble action is set to a first acceleration.

Meanwhile, in the second action control process, a strength with which a player character performing a dribble action kicks the ball 62 is set to a second strength which is stronger than the first strength. In other words, in the second action control process, an acceleration of the ball 62 kicked by a player character performing a dribble action is set to a second acceleration which is larger than the first acceleration.

As a result of the above described process having been carried out, in a case where the dribble parameter of a player character does not satisfy the condition, a distance between the player character performing a dribble action and the ball 62 becomes larger, compared to a case in which the dribble parameter satisfies the condition, as shown in FIGS. 7 and 8. In other words, in a case where the dribble parameter of a player character does not satisfy the condition, a displacement between the dribble trajectory of the player character and the dribble trajectory designated by a user becomes larger, compared to a case in which the dribble parameter of a player character satisfies the condition.

[5-2. Process to be Carried Out When Pass Operation is Performed]

Below, a process to be carried out in a case where a pass operation is performed will be described. With a pass operation performed, a process similar to that shown in FIG. 17 is carried out. Here, assume a case in which a user inputs the pass trajectory 74 on the game screen 60 shown in FIG. 9. That is, assume a case in which a user instructs the player character 64a to make a pass to the player character 64b, and also instructs the player character 64b, which will receive the pass from to player character 64a, to make a pass to the player character 64c.

In this case, a pass parameter condition correlated to the operation value range to which the operation value v of a slide operation belongs is read at S103 in FIG. 17. Then, whether or not the pass parameter of the player character 64a satisfies the condition read at S103 is determined at S104 in FIG. 17, and whether or not the pass parameter of the player character 64b satisfies the condition read at S103 is determined. With both determination results concluding that both pass parameters satisfy the respective conditions, the first action control process is carried out (S105). Meanwhile, with at least one of the two determination results concluding that the pass parameter does not satisfy the condition, the second action control process is carried out (S106).

In the first and second action control processes, a pass speed (the initial speed) is determined based on the operation value v of a slide operation. Specifically, data correlating an operation value v of a slide operation and a pass speed is read from the game memory card 40, and a pass speed corresponding to the operation value v of a slide operation is obtained based on the data. Note that the above-described data is set such that a larger operation value v of a slide operation, that is, a faster speed of a slide operation results in a faster pass speed. The above-described data may be table format data or expression format data.

In addition, in the first action control process, the angle θpa between the pass direction 76a of the player character 64a and the pass direction (trajectory 74) designated by a user is set to a first angle (for example, 0). Similarly, the angle θpb between the pass direction 76b of the player character 64b and the pass direction (trajectory 74) designated by a user is also set to the first angle (for example, 0).

Meanwhile, in the second action control process, if the pass parameter of the player character 64a does not satisfy the condition read at S103 in FIG. 17, the above-described angle θpa is set to a second angle which is larger than the first angle. In addition, if the pass parameter of the player character 64b does not satisfy the condition read at S103 in FIG. 17, the above-described angle θpb is set to the second angle which is larger than the first angle.

As a result of the above described process having been carried out, in a case where the pass parameters of the player characters 64a, 64b do not satisfy the condition, angles θpa, θpb between the pass directions 76a, 76b of the player characters 64a, 64b and the pass direction (the trajectory 74) designated by a user become larger, compared to a case in which the pass parameters of the player characters 64a, 64b satisfy the parameter condition, as shown in FIGS. 10 and 11.

[5-3. Process to be Carried Out When Shoot Operation is Performed]

Below, a process to be carried out in a case where a shoot operation is performed in the game device 10 will be described. That is, in a case where a shoot operation is performed, a process similar to that shown in FIG. 17 is carried out. Here, assume a case in which a user performs a shoot operation for causing the player character 64d to shoot on the game screen 60 shown in FIG. 12.

In this case, a shoot parameter condition correlated to the operation value range to which the operation value v of a slide operation belongs is read at S103 in FIG. 17, and whether or not the shoot parameter of the player character 64d satisfies the condition read at S103 is determined at S104 in FIG. 17. If the shoot parameter of the player character 64d satisfies the condition, the first action control process is carried out (S105). Meanwhile, if the shoot parameter of the player character 64d does not satisfy the condition, the second action control process is carried out (S106).

In the first and second action control processes, the shoot speed is determined based on the operation value v of a slide operation. Specifically, data correlating an operation value v of a slide operation and a shoot speed is read from the game memory card 40, and a shoot speed corresponding to the operation value v of a slide operation is obtained based on the data. Note that the above-described data is set such that a larger operation value v of a slide operation, that is, a faster speed of a slide operation, results in a faster shoot speed. The above-described data may be table format data or expression format data.

In the first action control process, the angle θs between the shoot direction 80 of the player character 64d and the shoot direction (trajectory 78) designated by a user is set to a first angle (for example, 0). Meanwhile, in the second action control process, the above-described angle θs is set to a second angle which is larger than the first angle.

As a result of the above process having been carried out, in a case where the shoot parameter of the player character 64d does not satisfy the condition, an angle θs between the shoot direction 80 of the player character 64d and the shoot direction (trajectory 78) designated by a user becomes larger, compared to a case in which the shoot parameter of the player character 64d satisfies the condition, as shown in FIGS. 13 and 14.

[6. Conclusion]

In the above-described game device 10, a user can designate the speed of dribble, pass, or shoot to be performed by a player character by adjusting the speed of a slide operation. In addition, in the game device 10, a user needs to adjust the speed of a slide operation while considering the dribble, pass, or shoot ability of a player character. Therefore, according to the game device 10, it is possible to give a user the enjoyment of being required to adjust the speed of a slide operation while considering dribble, pass, or shoot ability of a player character. This can resultantly enhance excitement of a dribble, pass, or shoot operation.

In the game device 10, a user can give an action instruction to a player character belonging to the first team by pointing at the ball 62. Further, a user can give an action instruction to a player character belonging to the first team by giving a movement instruction to the ball 62. That is, a user gives a movement instruction to the ball 62 and via the movement instruction given to the ball 62 indirectly gives an action instruction to a player character. Here, in a soccer game in which an action instruction is directly given to a player character by pointing at a player character, using a touch pen or the like, an instruction needs to be given to each of a plurality of player characters. This may result in a complicated operation for a user (for example, a user at a low trained level). Regarding this point, in the game device 10, all required by a user is to give an instruction to the ball 62, which enables a relatively easy operation by a user.

[7. Modified Example]

Note that the present invention is not limited to the above described embodiment.

[7-1. First Modified Example]

For example, a parameter which indicates pass-receiving ability may be stored as an ability parameter of a player character. Below, assume a case in which a user instructs, on the game screen 60 shown in FIG. 9, the player character 64a to make a pass to the player character 64b, and also instructs the player character 64b, which will receive a pass from the player character 64a, to make a pass to the player character 64c. In this case, it may be arranged such that, if the player character 64b does not have sufficient pass receiving ability to receive a pass at the speed designated by a user, the player character 64b fails an action to trap the ball 62 passed from the player character 64a. In this case, the player character 64b cannot stop the ball 62, which thus passes by the player character 64b. Similarly, it may be arranged such that, if the player character 64c does not have sufficient pass receiving ability to receive a pass at the speed designated by a user, the player character 64c fails an action to trap the ball 62 passed from the player character 64b. In this case, the player character 64c cannot stop the ball 62, which thus passes by the player character 64c.

[7-2. Second Modified Example]

In a second modified example, assume a case in which a user instructs the player character 64d to shoot on the game screen 60 shown in FIG. 12. In this case, the degree of the angle θs between the shoot direction 80 of the player character 64d and the shoot direction (trajectory 78) designated by a user may be determined at 5106 (at the second action control process) in FIG. 17 in the manner described below. That is, in the manner described below, it can be arranged such that a larger difference between the shoot speed designated by a user and a shoot speed at which the player character 64d can make an accurate shoot results in a larger angle θs between the shoot direction 80 of the player character 64d and the shoot direction (trajectory 78) designated by a user.

In this second modified example, initially, while referring to the parameter condition data, a parameter condition (a shoot parameter value range) correlated to an operation value range to which the operation value v of a slide operation belongs is read. For example, if an operation value v satisfies "V2≦v<V3", a shoot parameter value range "S2≦s<S3" is read.

Thereafter, a difference value between the shoot parameter value of the player character 64d and a representative value of the read shoot parameter value range is calculated. Here, a representative value of the shoot parameter value range may be, for example, an intermediate value of a shoot parameter value range. Alternatively, the maximum or minimum value of a shoot parameter value range may be used as the representative value. For example, if a shoot parameter value of the player character 64d is larger than the maximum value of the shoot parameter value range, the maximum value is used as the representative value, and if a shoot parameter value of the player character 64*d* is smaller than the minimum value of the shoot parameter value range, the minimum value may be used as the representative value.

Then, the above-described angle θs is determined based on the above-described difference value. For example, the angle θs is determined such that a larger difference value results in a larger angle θs. Note that in this case, data correlating a difference value and an angle θs is read from the game memory card 40 (game data storage unit 92). Then, an angle θs corresponding to the difference value is obtained based on the data, and the angle θs between the shoot direction 80 of the player character 64*d* and the shoot direction (trajectory 78) designated by a user is set to the obtained angle.

Note that a process to be described below may be carried out instead of the above described process. In the manner described below, it can be arranged such that a larger difference between the shoot speed designated by a user and a shoot speed at which a player character 64 can make an accurate shot results in a larger angle θs between the shoot direction 80 of the player character 64*d* and the shoot direction (trajectory 78) designated by a user.

In this modified example, initially, while referring to the parameter condition data, the operation value range correlated to a shoot parameter condition satisfied by the shoot parameter of the player character 64*d* is read. For example, if the shoot parameter (s) of the player character 64*d* satisfies "S2≦s<S3", an operation value range "V2≦v<V3" is read.

Thereafter, a difference value between the operation value v of a slide operation performed by a user and a representative value of the operation value range read is calculated. Here, the representative value of the operation value range may be, for example, the intermediate value of the operation value range. Alternatively, the maximum or minimum value of the operation value range may be used as the representative value. For example, if the operation value v is larger than the maximum value of the operation value range, the maximum value is used as the representative value, and if the operation value v is smaller than the minimum value of the operation value range, the minimum value may be used as the representative value.

Then, the above-described angle θs is determined based on the above-described difference value. For example, the angle θs is determined such that a larger difference value results in a larger angle θs. Note that in this case, data correlating a difference value and an angle θs is read from the game memory card 40 (game data storage unit 92). Then, an angle θs corresponding to the difference value is obtained based on the data, and the angle θs between the shoot direction 80 of the player character 64*d* and the shoot direction (trajectory 78) designated by a user is set to the obtained angle.

[7-3. Third Modified Example]

In the third modified example, assume a case in which a user instructs the player character 64*a* to make a pass to the player character 64*b* on the game screen 60 shown in FIG. 9. In this case, similar to the second modified example, it may be arranged such that a larger difference between the pass speed designated by a user and a pass speed at which the player character 64*a* can make an accurate pass results in a larger angle θpa between the pass direction 76*a* of the player character 64*a* and the pass direction (trajectory 74) designated by a user.

[7-4. Fourth Modified Example]

In the fourth modified example, assume a case in which a user instructs the player character 64*a* to perform a dribble action on the game screen 60 shown in FIG. 5. In this case, similar to the second modified example, it may be arranged such that a larger difference between the dribble speed designated by a user and a dribble speed at which the player character 64*a* can dribble accurately results in a stronger force with which the player character 64*a* performing a dribble action kicks the ball 62 or a larger acceleration of the ball 62 kicked by the player character 64*a* performing a dribble action. As described above, it may be arranged such that a larger difference between the dribble speed designated by a user and a dribble speed at which the player character 64*a* can dribble accurately results in a larger distance between the player character 64*a* performing a dribble action and the ball 62.

[7-5. Fifth Modified Example]

In the fifth modified example, assume a case in which a user instructs the player character 64*d* to shoot on the game screen 60 shown in FIG. 12. In this case, it may be arranged such that a mode (type) of a shoot action performed by the player character 64*d* may be changed based on the result of determination as to whether or not the shoot parameter of the player character 64*d* satisfies a parameter condition correlated to the operation value v of a slide operation. For example, if the shoot parameter of the player character 64*d* does not satisfy the parameter condition, the player character 64*d* may make a normal type of shot; if the shoot parameter of the player character 64*d* satisfies the parameter condition, the player character 64*d* may make a special shot. A "special shot" refers to, for example, a loop shot; a "loop shot" refers to a shot of a type in which the ball 62 moves along a parabola trajectory over the head of a player character of the opponent team. In this case, in order to cause the player character 64*d* to carry out a special shot, a user needs to adjust the speed of a slide operation while considering the shoot ability of the player character 64*d*. In this manner as well, it is possible to enhance excitement of a shoot operation. Note that it may be arranged such that a mode (type) of a dribble or pass action performed by a player character may be changed based on the result of determination as to whether or not the dribble or pass parameter of the player character satisfies the parameter condition correlated to the operation value v of a slide operation. In this manner, it is possible to enhance excitement of a dribble or pass operation.

[7-6. Sixth Modified Example]

A user may be able to designate a dribble, pass, or shoot speed by adjusting a force with which the user presses the button or the number of times the user presses the button. In this case, a force with which or the number of times the button is pressed is used as a user's operation value.

[7-7. Seventh Modified Example]

The length of a trajectory input through a slide operation or the manner in which the trajectory is bent may be used as a user's operation value. That is, it may be arranged such that, if a player character does not have sufficient ability to make dribble, a pass, or a shot which satisfies the length or the manner of bending designated by a user, the player character can make only a poor dribble, pass, or shot.

[7-8. Other Modified Examples]

For example, the game device 10 may be realized using a computer other than the portable game device 12. For example, the game device 10 may be realized using an installation type game device (a consumer game device), a commercial game device, a portable phone, a personal digital assistant (PDA), a personal computer, or the like.

It may be arranged such that a user can input a trajectory, using, for example, an operation input means other than the touch panel 22*b*. For example, a mouse may be used. Alternatively, a controller, such as a remote controller of Wii (registered trademark), or an installation type game device manufactured by Nintendo Co. Ltd, may be used.

For example, a game executed in the game device 10 may be a game other than a soccer game. The present invention is applicable to a game other than a soccer game. For example, the present invention is applicable to a game of basket ball, rugby, or American football, which is played using a ball (a moving object, a target) or a game of ice hockey, which is played using a puck (a moving object, a target). The present invention can be applied to a game (for example, an action game) other than a sport game. The present invention is applicable to a game in which a game character acts based on a user's operation.

The invention claimed is:

1. A game device for executing a game, the game device comprising:
at least one microprocessor that is configured to:
obtain an operation value of a user's operation;
determine an operation value range to which the operation value belongs;
read, from a storage, a parameter condition that is correlated to the determined operation value range, and an ability parameter of the player character that corresponds to the read parameter condition;
determine, in a determination, whether the ability parameter of the player character satisfies the parameter condition; and
control an action of the game character, based on a result of the determination.

2. The game device according to claim 1, wherein the at least one microprocessor controls behavior of a target which is a target for an action of the game character, based on a result of the determination.

3. The game device according to claim 1, wherein the at least one microprocessor reads, from the storage, a parameter value range that is correlated to the operation value range,
the at least one microprocessor determines whether a value of the ability parameter is within the read parameter value range, and
the at least one microprocessor controls, in a case where it is determined that the value of the parameter is not within the parameter value range, an action of the game character, based on a difference between the value of the ability parameter and a representative value of the parameter value range.

4. The game device according to claim 1, wherein
the at least one microprocessor reads, from a storage, a parameter value range that is correlated to the determined operation value range,
the at least one microprocessor determines whether a value of the ability parameter belongs to the parameter value range, and
the at least one microprocessor, in a case where it is determined that the value of the ability parameter does not belong to the parameter value range, controls an action of the game character, based on a difference between the operation value and a representative value of the determined operation value range.

5. The game device according to claim 1, wherein
the game is a sport game which is played using a moving object,
the game character is a player character,
the ability parameter includes a dribble parameter concerning a dribble action of the player character,
the at least one microprocessor obtains the operation value based on a dribble operation for causing the player character to perform a dribble action,
the at least one microprocessor controls the dribble action of the player character, based on a result of the determination, and
the at least one microprocessor, in a case where it is determined that the dribble parameter does not satisfy the parameter condition, controls the dribble action of the player character such that a distance between the player character performing the dribble action and the moving object becomes larger, compared to a case in which it is determined that the dribble parameter satisfies the parameter condition.

6. The game device according to claim 1, wherein
the game is a sport game which is played using a moving object,
the game character is a player character,
the ability parameter includes a pass parameter concerning a pass action of the player character,
the at least one microprocessor obtains the operation value based on a pass operation for causing the player character to perform a pass action,
the at least one microprocessor controls the pass action of the player character, based on a result of the determination, and
the at least one microprocessor, in a case where it is determined that the pass parameter does not satisfy the parameter condition, controls the pass action of the player character such that a displacement between a pass direction designated by a user and a pass direction of the player character becomes larger, compared to a case in which it is determined that the pass parameter satisfies the parameter condition.

7. The game device according to claim 1, wherein
the game is a sport game which is played using a moving object,
the game character is a player character,
the ability parameter includes a shooting parameter concerning a shooting action of the player character,
the at least one microprocessor obtains the operation value based on a shooting operation for causing the player character to perform a shooting action,
the at least one microprocessor controls the shooting action of the player character, based on a result of the determination,
the at least one microprocessor, in a case where it is determined that the shooting parameter does not satisfy the parameter condition, controls the shooting action of the player character such that a displacement between a shooting direction designated by a user and a shooting direction of the player character becomes larger, compared to a case in which it is determined that the shooting parameter satisfies the parameter condition.

8. The game device according to claim 1, wherein the at least one microprocessor controls a type of action of the game character, based on a result of the determination.

9. The game device according to claim 1, wherein
the game is a sport game which is played using a moving object,
the game character is a player character, and
the at least one microprocessor is further configured to:
obtain a position pointed at by a user, and
receive, in a case where the user points at the moving object, an input operation of a movement trajectory of the moving object,
obtain an operation value concerning an input operation of the movement trajectory of the moving object, and control an action of the player character, based on the movement trajectory of the moving object input by the user and a result of the determination.

10. The game device according to claim 1, wherein the at least one microprocessor obtains, as the operation value of the user's operation, an operation value of a slide operation performed on a touch screen.

11. The game device according to claim 10, wherein the operation value of the slide operation comprises at least one of a value indicating a length of a trajectory of the slide operation, a value indicating a speed of the trajectory, and a value indicating a manner in which the trajectory is bent.

12. The game device according to claim 1, wherein the at least one microprocessor obtains, as the operation value of the user's operation, an operation value of a button pressing operation.

13. The game device according to claim 12, wherein the operation value of the button pressing operation comprises at least one of a value indicating the strength of a force with which the button is pressed, and a value indicating the number of times the user presses the button.

14. The game device of claim 1, wherein the at least one microprocessor controls the player character to perform a first action control process when the ability parameter satisfies the parameter condition, and controls the player character to perform a second action control process when the ability parameter does not satisfy the parameter condition.

15. The game device of claim 1, wherein
the ability parameter includes at least one of a dribble parameter indicating the dribble ability, a pass parameter indicating the pass ability, and a shoot parameter indicating the shoot ability, and
the parameter condition is a condition concerning the at least one of the dribble parameter, the pass parameter, and the shoot parameter.

16. A method for controlling a game device for executing a game, the method comprising:
obtaining an operation value of a user's operation;
determining an operation value range to which the operation value belongs;
reading, from a storage, a parameter condition that is correlated to the determined operation value range, and an ability parameter of the player character that corresponds to the read parameter condition;
determining, in a determination, whether the ability parameter of the player character satisfies the parameter condition; and
controlling an action of the game character, based on a result of the determination.

17. A non-transitory computer readable information storage medium storing a program in non-transitory form for causing a computer to function as a game device for executing a game, the program for causing at least one microprocessor of the computer to:
obtain an operation value of a user's operation ;
determine an operation value range to which the operation value belongs;
read, from a storage, a parameter condition that is correlated to the determined operation value range, and an ability parameter of the player character that corresponds to the read parameter condition;
determines, in a determination, whether the ability parameter of the player character satisfies the parameter condition; and
controls an action of the game character, based on a result of the determination.

18. A game device for executing a game, the game device comprising:
operation value obtaining means for obtaining an operation value of a user's operation;
determination means for determining an operation value range to which the operation value belongs, reading, from a storage, a parameter condition that is correlated to the determined operation value range, and an ability parameter of the player character that corresponds to the read parameter condition, and determining whether the ability parameter of the player character satisfies the parameter condition; and
control means for controlling an action of the game character, based on a result of the determination by the determination means.

19. A game device for executing a game, the game device comprising:
an operation value obtaining unit that obtains an operation value of a user's operation;
a determination unit that determines an operation value range to which the operation value belongs, reads, from a storage, a parameter condition that is correlated to the determined operation value range, and an ability parameter of the player character that corresponds to the read parameter condition, and determines whether the ability parameter of the player character satisfies the parameter condition; and
control means for controlling an action of the game character, based on a result of the determination by the determination unit.

20. A non-transitory computer readable information storage medium storing a program in non-transitory form for causing a computer to function as a game device for executing a game, the program for causing the computer to function as:
operation value obtaining means for obtaining an operation value of a user's operation;
determination means for determining an operation value range to which the operation value belongs, reading, from a storage, a parameter condition that is correlated to the determined operation value range, and an ability parameter of the player character that corresponds to the read parameter condition, and determining whether the ability parameter of the player character satisfies the parameter condition; and
control means for controlling an action of the game character, based on a result of the determination by the determination means.

21. A non-transitory computer readable information storage medium storing a program in non-transitory form for causing a computer to function as a game device for executing a game, the program for causing the computer to function as:
an operation value obtaining unit that obtains an operation value of a user's operation;
a determination unit that determines an operation value range to which the operation value belongs, reads, from a storage, a parameter condition that is correlated to the determined operation value range, and an ability parameter of the player character that corresponds to the read parameter condition, and determines whether the ability parameter of the player character satisfies the parameter condition; and
a control unit that controls an action of the game character, based on a result of the determination by the determination unit.

* * * * *